Patented Sept. 19, 1950

2,523,138

UNITED STATES PATENT OFFICE 2,523,138

RECOVERY OF IRON FROM ITS ORES

Assur Gjessing Oppegaard, Fredrikstad, Norway, assignor to Titan Company, Inc., New York, N. Y., a corporation of Delaware No Drawing. Application September 12, 1947, Serial No. 773,738. In Norway December 30, 1942

Section 1, Public Law 690, August 8, 1946
Patent expires December 30, 1962

3 Claims. (Cl. 75—31)

This invention relates to the recovery of iron from its ores, particularly from iron oxide ores.

An object of the invention is to provide simple and effective means for separation of gangue and other impurities from the iron compounds in the ore, so as to allow a satisfactory recovery of iron even from low-grade ores. Another object of the invention is to produce an iron concentrate rich in iron and with very low contents of impurities, such as sulphur and phosphorus, and thus well suited for the production of iron and steel of high quality. A further object of the invention is to provide means for a cheap and simple pre-reduction of iron ores, so as to facilitate the subsequent operation in the steel furnace. A still further object of the invention is to produce high grade iron and steel.

The process according to the invention consists broadly in a thermal reduction without sintering or smelting of the ore, so as to convert maximum 80 per cent and preferably from 50% to 80% of the iron to the metallic state; subsequent magnetic separation of the ore thus reduced; and a final reduction of the magnetic concentrate fully to metallic iron.

More particularly the invention comprises a process as described above in which the conditions of the reduction previous to the magnetic separation is adjusted so as to obtain a conversion of between about 50 and 80 per cent of the total reducible iron in the ore to metallic state. With a great number of different iron oxide ores, the reduction to a degree within the mentioned range proceeds readily at relatively low temperatures without causing a sintering or smelting of the charge. By magnetic separation of the thus reduced ore a concentrate of high purity is obtained consisting substantially of iron oxides together with metallic iron in finely divided state, and tailings consisting of the gangue and other impurities of the ore together with ashes and excess of coke in the event of solid reduction agents having been used.

This partial reduction may be carried out in a rotary furnace with ore crushed to a suitable size and with solid carbonaceous reduction agents, as coal or coke. The reduction temperature required is relatively low. Generally, the reduction temperature will be below 1000° C. and preferably in the range of between about 850° C. and 1000° C. Rapid and efficient reduction may be obtained at a temperature of about 900° C. By the use of such low temperatures a sintering or smelting of the charge is avoided. A further advantage is that sulphur and phosphorus contained in the reducing agents and in the ore do not combine with the iron. Apart from the obvious advantage of obtaining a pure concentrate this allows the use of reduction material of inferior quality, such as coke fines. The consumption of fuel is relatively low.

It is convenient, but not in all cases necessary, to separate the crushed ore into fractions of substantially even particle size and to reduce each fraction to the required degree separately in order to obtain an approximate even degree of reduction throughout each charge. The separation into various fractions may be accomplished by screening or other suitable methods.

The recovery of iron in the magnetic concentrate from the partial reduction varies somewhat with the degree of reduction. (The term "degree of reduction" whenever used in this application means metallic iron present expressed in per cent of the total reducible iron in the ore as subjected to the reducing treatment.)

In a series of experiments with an iron ore containing about 50% iron a recovery of about 90% of the total iron was obtained at a degree of reduction of 80%. At a reduction degree of about 50% the recovery obtained with the same ore was about 80%. The optimum reduction degree is chosen with a view to the properties of the raw material used, taking into consideration further treatment of the concentrate. As a general rule, the recovery of iron in the concentrate decreases rapidly at reduction degrees below 50%. On the other hand, it has been found that the degree of reduction should be kept below about 80%. If the degree of reduction is increased substantially above this limit, the difficulties encountered in the sponge iron processes occur. Particularly sintering and even smelting may take place, and the product becomes tough and difficult to pulverize, while within the range of the reduction degree used according to this invention a friable and crisp product is obtained which is readily pulverizable, and the structure of which is such that by magnetic separation, the iron oxides follow the metallic iron in the magnetic concentrate, so that tailings containing practically all the gangue and impurities and very small amounts of iron compounds are obtained. It is believed that a reason for this is that no sintering of the ore particles takes place during the reduction, whereby any inclusion of gangue agglomerates in the ore particles is avoided. It has further been found that above a degree of reduction of 80% the amounts of sulphur and phosphorus combined with the iron increase rapidly, and for this reason as well as on account of an increase in other impurities the products become less suited for the production of iron and steel.

If the ore contains greater amounts of sulphur which cannot readily be removed before the partial reduction, e. g. pyrites distributed in the particles of the ore, it is advantageous to subject the ore to an appropriate roasting before the reduction.

With solid reducing agents, it is advantageous to carry out the reduction in a rotary furnace provided with tubes distributed over its length and penetrating its walls. The tubes have valves at their exterior ends. This arrangement permits a controlled introduction of air at different points of the furnace. The temperatures in the inner of the furnace can easily be regulated. The whole of the CO can be burnt to $CO_2$ within the furnace without affecting disadvantageously the reduction process; whereby the heat value of the fuel is practically fully utilized. Rotary furnaces of the described kind may also be used in connection with reduction with gases, but a particular advantage as to economical utilization of the fuel and satisfactory is obtained by using them in connection with solid carbonaceous reducing agents.

The magnetic separation is preferably, but not necessarily carried out in two or more steps. Thus the reduced ore may be subjected to alternate grinding and magnetic separation for example, by first grinding to a particle size of about 1 mm., then separating magnetically, further grinding the magnetic concentrate to a particle size of below 0.15 mm. followed by another magnetic separation step.

The final reduction of the magnetic concentrate to metallic iron can be carried out according to known methods comprising smelting in blast furnaces or in steel furnaces as well as according to methods comprising a dry reduction at relatively low temperatures so that a smelting of the iron does not occur, such as the so-called sponge iron processes. It is in many cases preferable to briquette the concentrate before the final reduction. Briquettes have been made of the wet concentrate without addition of special binding agents. When using wet magnetic separation, the concentrate may thus pass direct from the magnetic separation to a rotary filter to be dewatered and thereupon introduced in the briquetting press without being dried. Hereby a dust-free process is obtained. If desired, the requisite amount of carbonaceous reducing agent may be added previous to the briquetting.

The quantity of reducing agent required for the final reduction of the partially reduced concentrate is relatively small. If the first reduction step has been carried to, for example, 70% degree of reduction, the remaining reduction requires 60–70 kgs. of coal per ton of metallic iron produced. On account of this relatively low consumption of reducing agents the final reduction may be carried out with pure reducing agents, such as charcoal or anthracite.

As mentioned above, the partial reduction can be carried out with cheap reducing agents. The total cost of fuel and reducing agents of the process according to the invention is thus favorable as compared with known methods for the reduction of iron ore.

*Example 1*

An iron ore with about 50 per cent Fe, chiefly as hematite, was ground to below 10 mm. and the material was separated according to particle size in following fractions:

Less than 10 mm.—more than 4 mm.
Less than 4 mm.—more than 1 mm.
Less than 1 mm.

The fractions were each separately mixed with 20 per cent pulverized coke and introduced into reducing furnaces, having over their length tubes for controlled admission of air. The reduction was carried on until about 75% of the total iron content of the ore was reduced to metallic state. The reduction of the coarser fractions was carried out at about 950° C. and that of the finer fractions at 900° C. The material was quenched in water, pulverized to a particle size of 50 mesh and subjected to a wet-magnetic separation in several steps. The magnetic concentrate of the average from the several fractions gave the following analysis:

88.7 per cent total Fe
66.3 per cent metallic Fe
28.7 per cent FeO
3.1 per cent gangue
0.1 per cent S
0.05 per cent P The recovery of iron in the concentrate was 88 per cent of the total iron in the crude ore.

The magnetic concentrate was dewatered on a rotary filter and thereupon briquetted. During the briquetting the contents of water decreased from 10 per cent to 5 per cent.

The briquettes were reduced further to steel.

*Example 2*

An iron ore of the same type as described in Example 1 and screened to the same particle size fractions was reduced in rotary furnaces by means of coke oven gas. The furnaces had also in this case tubes for controlled admission of air at any convenient point in the furnace. The reduction was carried on until about 80% of the total iron content of the ore was reduced to metallic state. The highest temperature of the ore was measured near the exit and was for the coarse ore fractions about 925° C. and for the finer fractions only 875° C.

After reduction the fractions were crushed and magnetically separated in wet state similar to the procedure of Example 1. The magnetic concentrate of average of the different fractions had the following composition:

92.5 per cent total Fe
75.4 per cent metallic Fe
22 per cent FeO
2 per cent insoluble gangue
0.05 per cent S
0.05 per cent P The recovery of iron in the concentrate was 86% of the total iron in the crude ore.

*Example 3*

An iron ore of the same type as described in Example 1 was crushed to below 1 mm. and reduced in a rotary furnace by means of pulverized coke. The rotary furnace was equipped with tubes for controlled admission of air at any convenient point. The reduction was carried on until about 70% of the total iron content of the ore was reduced to metallic state. The maximum temperature in the furnace was about 900° C.

The reduced material was quenched in water, pulverized to a particle size of 100 mesh and subjected to a wet magnetic separation in several steps. The final magnetic concentrate showed the following analysis:

87.1 per cent total Fe
60.7 per cent metallic Fe
36.9 per cent FeO
2.7 per cent gangue
0.08 per cent S
0.05 per cent P The recovery of iron in the concentrate was 83% of the total iron in the crude ore.

*Example 4*

An iron ore of the same type as described in Example 1 was crushed to a particle size below 1 mm. and reduced in a rotary furnace by means of pulverized coke. The rotary furnace was equipped with tubes for controlled admission of air at any convenient point. The reduction was carried on until about 50% of the total iron content of the ore was reduced to metallic state. The maximum temperature in the furnace was about 900° C.

The reduced material was quenched in water, pulverized to a particle size of 50 mesh and subjected to a wet magnetic separation in several steps. The final magnetic concentrate showed the following analysis:

78.7 per cent total Fe
39.3 per cent metallic Fe
50.7 per cent FeO
6.3 per cent gangue
0.08 per cent S
0.05 per cent P The recovery of iron in the concentrate was in this case 82% of the total iron in the crude ore.

The magnetic concentrate was dewatered on a rotary filter and thereupon briquetted.

The briquettes were taken to an electric steel furnace, where they were completely reduced and melted to steel of excellent quality.

While this invention has been described and illustrated by the examples shown, it is not intended to be particularly limited thereto and other variations and modifications may be employed as limited by the following claims.

I claim:
1. Process for producing metallic iron from iron ores which comprises heating a comminuted iron ore under reducing conditions until from about 50% to about 80% of the total reducible iron content of said ore is reduced to metallic state whereby a friable product is obtained containing metallic iron and partially reduced iron oxide, subjecting the product to magnetic separation and thereafter further reducing the magnetic concentrate consisting essentially of metallic iron and iron oxide to metallic iron.

2. Process for producing metallic iron from iron ores which comprises heating at temperatures between about 800° C. and 1000° C. a comminuted iron ore under reducing conditions until from about 50% to about 80% of the total reducible iron content of said ore is reduced to metallic state whereby a friable product is obtained containing metallic iron and partially reduced iron oxide, subjecting the product to magnetic separation, and thereafter further reducing the magnetic concentrate consisting essentially of metallic iron and iron oxide to metallic iron.

3. Process for producing metallic iron from iron ore which comprises mixing comminuted iron ore with a comminuted carbonaceous reducing agent, heating said mixture at temperatures between about 800° C. and 1000° C. until from about 50% to about 80% of the total reducible iron content of said ore is reduced to metallic state whereby a friable product is obtained containing metallic iron and partially reduced iron oxide, subjecting the product to magnetic separation, and thereafter further reducing the magnetic concentrate consisting essentially of metallic iron and iron oxide to metallic iron.

ASSUR GJESSING OPPEGAARD.

REFERENCES CITED

The following references are of record in the file of this patent:

UNITED STATES PATENTS

| Number | Name | Date |
|---|---|---|
| 1,557,107 | Trent | Oct. 13, 1925 |
| 1,635,950 | Nevill | July 27, 1927 |
| 1,760,078 | Newkirk et al. | May 27, 1930 |
| 1,797,130 | Coley | Mar. 17, 1931 |
| 1,841,602 | Hornsey | Jan. 19, 1932 |
| 2,026,683 | Johannsen | Jan. 7, 1936 |
| 2,123,240 | Hammarberg | July 12, 1938 |
| 2,240,718 | Schiffman et al | May 6, 1941 |
| 2,296,522 | Hartley et al. | Sept. 22, 1942 |
| 2,339,793 | Moklebust et al. | Jan. 25, 1944 |
| 2,339,808 | Ravenstad et al. | Jan. 25, 1944 |

FOREIGN PATENTS

| Number | Country | Date |
|---|---|---|
| 125,549 | Sweden | July 12, 1949 |